United States Patent [19]
Widt

[11] Patent Number: 5,663,487
[45] Date of Patent: Sep. 2, 1997

[54] CAPILLARY TUBE DETERMINING THE LEAKAGE RATE FOR A TEST LEAK

[75] Inventor: Rudi Widt, Cologne, Germany

[73] Assignee: Leybold Aktiengesellschaft

[21] Appl. No.: 682,747

[22] PCT Filed: Jan. 18, 1995

[86] PCT No.: PCT/EP95/00166

§ 371 Date: Jul. 30, 1996

§ 102(e) Date: Jul. 30, 1996

[87] PCT Pub. No.: WO95/21373

PCT Pub. Date: Aug. 10, 1995

[30] Foreign Application Priority Data

Feb. 2, 1994 [DE] Germany .................. 9401661 U
Feb. 2, 1994 [DE] Germany .................. 9401662 U

[51] Int. Cl.$^6$ .................................................. G01M 3/00
[52] U.S. Cl. ............................................................ 73/1.26
[58] Field of Search .................................. 73/1 G, 3, 1 R, 73/864.21, 864.85

[56] References Cited

U.S. PATENT DOCUMENTS

| | | |
|---|---|---|
| 3,209,579 | 10/1965 | Roberts . |
| 5,092,158 | 3/1992 | Tuma et al. ............... 73/3 |
| 5,157,958 | 10/1992 | Geisinger ............... 73/3 |
| 5,363,689 | 11/1994 | Hoffmann et al. ............... 73/3 |

FOREIGN PATENT DOCUMENTS 3636490  4/1988  Germany .

OTHER PUBLICATIONS

Patent Abstract of Japan vol.6, No.63 (c–099) Apr. 22, 1982 & JP,A, 57 003 723 (Furukawa Electric Co. Ltd.) Jan. 9, 1982.
Le Vide, Les Couches Minces, vol. 200, Jan. 1980, Paris, FR pp. 33, 45, 46 B.Blank et al. 'Techniques De Controle De L'Etancheite'.
Jennings, Walter G.: Comparisons of Fused Silica and Other Glass Columns in Gas Chromatography, Dr. Alfred Huthig Verlag, Heidelberg, 1981, S.52–55.
Goldfarb, S.R.: Some Practical Considerations in the Application of the Helium Mass Spectrometer Type Leak Detector. In: materials evaluation, Aug. 1967, S.177–182.
Bihatka, S.; et al; Leak detection of high pressure vessels. In: Vacuum, vol. 33, No.1/2, 1983, S. 17–18.
Burger, H.D.: Lecksuche and Chemieanlagen mit Helium-–Massenspektrometer–Lecksuchern. In: Vakuum–Technik, 29. Jg., H.8, pp. 232–245 Oct. 1980.
I.G.Baryshnikova A., et al; A Leak Stimulator For Calibrating Helium Leak Detectors During Tests By The Probe Method; In: Instruments and Experimental Techniques, UDC 533.5, No.6—Part 2, Dec. 1973, 1763.

*Primary Examiner*—Thomas P. Noland
*Attorney, Agent, or Firm*—Harris Beach & Wilcox LLP

[57] ABSTRACT

The invention relates to a capillary tube (1) determining the leakage rate for a test leak; in order to simplify its production and reduce the risk of breakage, it is proposed that the capillary tube (1) be a prior art quartz capillary tube encased in plastic. A holder joined to one end of the capillary tube by a removable connecting coupler has a nozzle for introducing a test sample into the tube.

5 Claims, 1 Drawing Sheet

CAPILLARY TUBE DETERMINING THE LEAKAGE RATE FOR A TEST LEAK

BACKGROUND OF THE INVENTION

Test leaks are employed for checking and/or calibration of leak detectors which operate with a test gas. These are equipped with a capillary tube as the element which determines the leakage rate. Mostly helium is used as the test gas.

Until today, the capillary tubes for test leaks are drawn from a glass tube. Attaining a specific leakage rate requires a high degree of skill and sensitivity. Each manually produced capillary tube must be measured up on a leak detector. Thereafter, it is either discarded or redrawn and measured again. For this type of production the reject rate of the capillary tubes is therefore high. Moreover, the drawn capillary tubes (having a diameter of several tenths of a millimeter) are exceptionally prone to breakage. Even capillary tubes which are contained in a housing may be destroyed by mechanical influences.

SUMMARY OF THE INVENTION

It is the task of the present invention to create a capillary tube which determines the leakage rate for a test leak, no longer offering the disadvantages described.

This task is solved by the present invention in that the capillary tube is a prior art quartz capillary tube encased in plastic. Capillary tubes of this kind are employed in chromatography. They consist of quartz glass and are commonly encased with polyimide. Owing to this encasing they are no longer prone to breakage. Capillary tubes of this kind can be produced in lengths up to 10 m and with a constant inside diameter (down to 0.005 mm and less). In order to attain a specific leakage rate it is thus only required to employ a section having a certain length and a certain inside diameter. Hand crafted glass drawing work is no longer required.

BRIEF DESCRIPTION OF THE DRAWINGS

Preferably they are equipped on one side with a holder, which may be designed like a spray nozzle, for example. Thus very small and easy to handle elements result which may be employed as elements determining the leakage rate in test leaks.

Further advantages and details of the present invention shall be explained by referring to drawing FIGS. 1 and 2.

DESCRIPTION OF THE INVENTION

Figure 1:
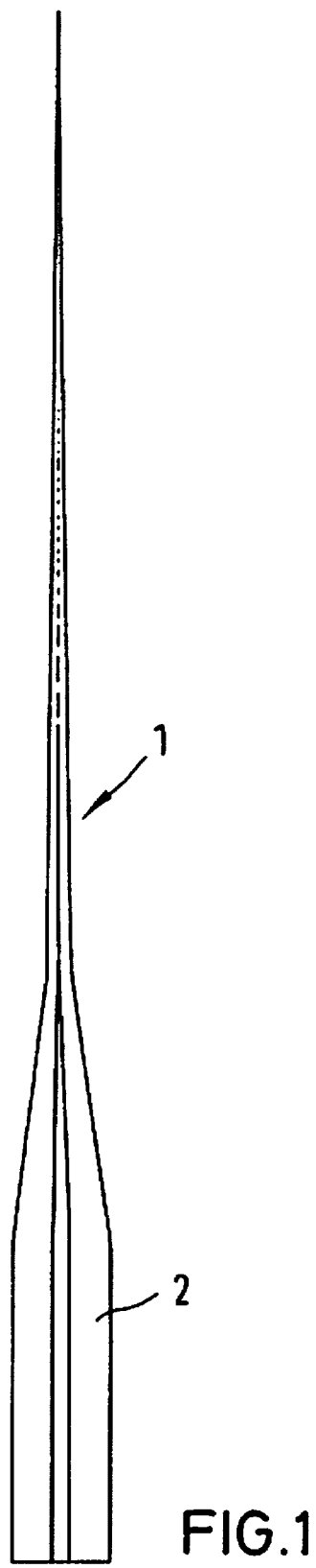

Drawing FIG. 1 shows a capillary tube which determines the leakage rate according to the state-of-the-art. It is drawn from a glass tube 2, the outside diameter of which is maintained at one end in order to be able to handle the glass capillary tube. Thus fairly large dimensions result.

Figure 2:
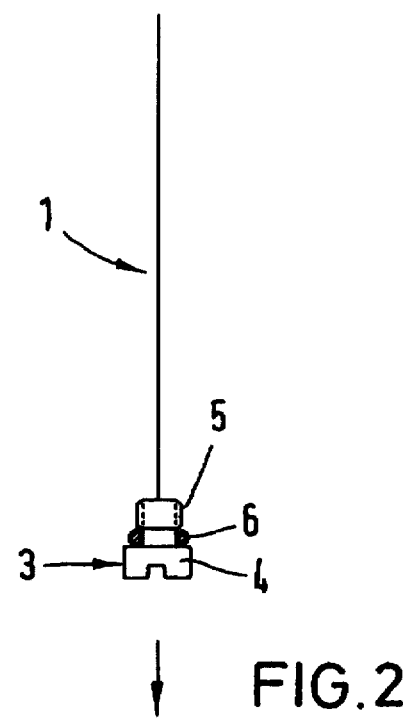

The element which determines the leakage rate according to drawing FIG. 2 comprises a capillary tube section made of quartz glass encased by plastic. Capillary tubes of this kind are known from chromatography. They may be obtained from the company SGE, for example. One side of capillary tube 1 is equipped with a holder 3 which is designed like a spraying nozzle. Capillary tube 1 is cemented into the inside diameter of spraying nozzle 3.

Spraying nozzle 3 corresponds to a machine screw with head 4 and thread 5. With the aid of thread 5, the element which determines the leakage rate may be screwed into the housing of a test leak. In order to attain a vacuum-tight seal—with the exception of the opening of the capillary tube—a sealing ring 6 is attached at the bottom side of head 4.

With the element according to drawing FIG. 2 which determines the leakage rate, leaks of various sizes (gas flow quantities) may be produced. The desired gas flow may be pre-determined by selection from the available diameters and lengths of the capillary tube 1. Because of the close tolerances of the capillary tube columns known from chromatography, involved measurements can be dispensed with. Capillary tube 1 has the same diameter over its entire length. It may thus be used in a space saving manner. Also the velocity of the gas flow is the same over its entire length.

Owing to the high elasticity of the capillary tube columns known from chromatography, capillary tube 1 may also be used in a bent or helical shape. Together with the holder designed as a spraying nozzle 3, the element is easy to handle. It may be screwed into the prepared housing with an O-ring seal and it may be exchanged.

I claim:

1. Apparatus for use in calibrating and checking leak detectors that is not prone to breakage that includes, a capillary tube having a known inside diameter and length;

a holder joined to one end of the capillary tube having a nozzle means for introducing a test sample into said tube, said holder further including connector means for removable coupling the holder to a testing means for producing a vacuum tight seal between the holder and said testing means.

2. The apparatus of claim 1 wherein said capillary tube is made of glass and further includes a protective outer coating.

3. The apparatus of claim 2 wherein the protective coating is made of plastic.

4. The apparatus of claim 1 wherein said holder has a threaded shank that is receivable in said testing means and a means for sealing the holder against said testing means.

5. The apparatus of claim 1 wherein the capillary tube is slidably received inside said nozzle means and further includes cementing means for securing the capillary tube to the nozzle means.

* * * * *